(12) United States Patent
Kriz et al.

(10) Patent No.: US 6,968,473 B2
(45) Date of Patent: Nov. 22, 2005

(54) METHOD AND APPARATUS FOR GENERATING A VIRTUAL CLOCK IN A DATA PROCESSING SYSTEM

(75) Inventors: Thomas Alois Kriz, Cedar Park, TX (US); Jose Luis Ortiz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 09/998,394

(22) Filed: Nov. 15, 2001

(65) Prior Publication Data

US 2003/0093705 A1    May 15, 2003

(51) Int. Cl.$^7$ ............................................. G06F 13/14

(52) U.S. Cl. ..................... 713/500; 713/400; 713/401; 713/600; 709/400; 709/248; 712/400

(58) Field of Search ................................ 713/500, 400, 713/401, 600; 712/13; 709/248, 400

(56) References Cited

U.S. PATENT DOCUMENTS

| | | | | |
|---|---|---|---|---|
| 4,564,903 | A | | 1/1986 | Guyette et al. ............. 364/300 |
| 4,843,541 | A | | 6/1989 | Bean et al. .................. 364/200 |
| 5,345,590 | A | | 9/1994 | Ault et al. .................. 395/650 |
| 5,636,373 | A | * | 6/1997 | Glendening et al. ........ 713/400 |
| 6,209,106 | B1 | * | 3/2001 | Kubala et al. ............... 713/500 |
| 6,523,155 | B1 | * | 2/2003 | Ruedinger ...................... 716/7 |
| 6,658,636 | B2 | * | 12/2003 | Hochapfel ...................... 716/7 |
| 6,671,644 | B2 | * | 12/2003 | Huisman et al. ............. 702/117 |
| 6,711,693 | B1 | * | 3/2004 | Golden et al. ............... 713/400 |
| 6,854,019 | B2 | * | 2/2005 | Egle ........................... 709/248 |

OTHER PUBLICATIONS

IBM Technical Disclosure Bulletin, "Hypervisor High Performance Synchronous Dispatch for Coupled Systems", vol. 39, No. 12, Dec. 1996.
IBM Technical Disclosure Bulletin, "VM MPG Operating as a DRF Hypervisor as a First Level Guest Under PR/SM", vol. 38, No. 04, Apr. 1995, p. 325.
IBM Technical Disclosure Bulletin, "Sharing Read-Only Memory among Multiple Logical Partitions", vol. 36, No. 03, Mar. 1993, pp. 303-304.
IBM Technical Disclosure Bulletin, "Highly Parallel Coupling Facility Emulator/Router with Shadowed Link Buffers", vol. 39, No. 12, Dec. 1986.
IBM Technical Disclosure Bulletin, "Coordinating Multiple Server Partitions to Enter Power-Sav State", vol. 39, No. 06, Jun. 1996, pp. 235-239.

* cited by examiner

*Primary Examiner*—A. Elamin
(74) *Attorney, Agent, or Firm*—Duke W. Yee; Mark E. McBurney; James O. Skarsten (57) ABSTRACT

A method, apparatus, and computer instructions for managing a set of virtual clocks in a data processing system with multiple partitions. A "set-time-of-day" command is used in connection with each virtual clock to define a basis for its local date/time state via the following elements: (1) a partition peculiar time base reference value, and (2) a partition peculiar time offset reference value which corresponds to the state of an elapsed time counter at the point in time when the time base reference value is established. The partition time base reference and offset reference values are stored in memory. When executing a "get-time-of-day" command, these are retrieved along with the current state of the elapsed time counter facility to compute the current date/time state of the virtual clock for the partition.

30 Claims, 4 Drawing Sheets

FIG. 1
100 DATA PROCESSING SYSTEM

METHOD AND APPARATUS FOR GENERATING A VIRTUAL CLOCK IN A DATA PROCESSING SYSTEM

BACKGROUND OF THE INVENTION

1. Technical Field

The present invention relates generally to an improved data processing system, and in particular the present invention provides a clock system for use in a data processing system. Still more particularly, the present invention provides a method, apparatus, and computer instructions for generating a set of virtual clocks within a logically partitioned data processing system.

2. Description of Related Art

A logical partitioning (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

Some resources, however, might be shared globally between a set of partitions. One such resource is the clock system on the platform. Each OS environment in a set of partitions also frequently requires a clock, which is distinctly different from those used in other partitions. Thus, each partition can require a virtual clock with a specific date/time basis (i.e. a time zone, or a time advance, or lag) which is peculiar to its own environment. It would be advantageous to have an improved method, apparatus, and computer instructions for implementing such a service within a single platform clock subsystem.

SUMMARY OF THE INVENTION

The present invention provides a method, apparatus, and computer instructions for managing a set of virtual clocks in a data processing system with multiple partitions. A "set-time-of-day" command is used in connection with each virtual clock to define a basis for its local date/time state via the following elements: (1) a partition peculiar time base reference value, and (2) a partition peculiar time offset reference value which coresponds to the state of an elapsed time counter at the point in time when the time base reference value is established. The partition time base reference and offset reference values are stored in memory. When executing a "get-time-of-day" command, these are retrieved along with the current state of the elapsed time counter facility to compute the current date/time state of the virtual clock for the partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
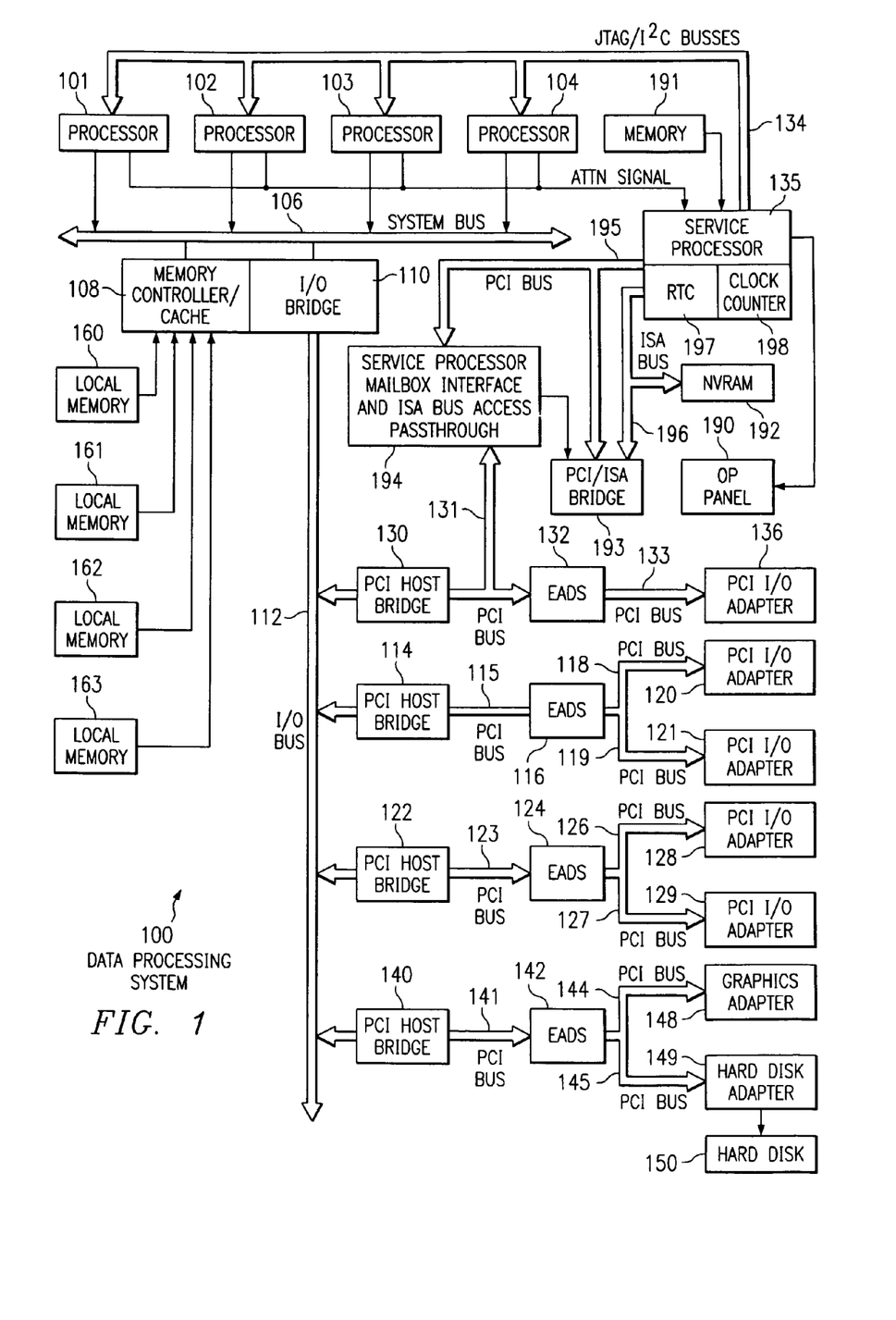
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, and 136, graphics adapter 148, and hard disk adapter 149 may be assigned to different logical partitions.

Thus, for example, suppose data processing system 100 is divided into three logical partitions, P1, P2, and P3. Each of I/O adapters 120–121, 128–129, 136, and graphics adapter 148, and hard disk adapter 149, each of processors 101–104, and each of local memories 160–163 is assigned to one of the three partitions. For example, processor 101, local memory 160, and I/O adapters 120, 128, and 129 may be assigned to logical partition P1; processors 102–103, memory 161, and PCI I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129 by PCI busses 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI busses 141 and 144 as depicted. Also, a hard disk 150 may also be connected to I/O bus 112 through PCI Host Bridge 140 and EADS 142 via PCI busses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. ISA bus access pass-through logic 194 forwards PCI accesses destined to the PCI/ISA bridge 193. NVRAM storage 192 is connected to the ISA bus 196. Service processor 135 is coupled to service processor mailbox interface 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Real time clock (RTC) 197 provides a clock system within data processing system 100. Real time clock 197 is part of service processor 135 and may be accessed through ISA bus 196 in this example. Clock counter 198 is also located within service processor 135 and is accessed through ISA bus 196. Clock counter 198 provides a counter value, and this value is incremented in response to a selected frequency. In these examples, the selected frequency does not vary. Clock counter 198 is used in the clock system of the present invention, which is described in more detail below. Both components, RTC 197 and clock counter 198, are accessed via ISA bus 196 by system firmware that executes on host processors 101, 102, 103, and 104 in these examples.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
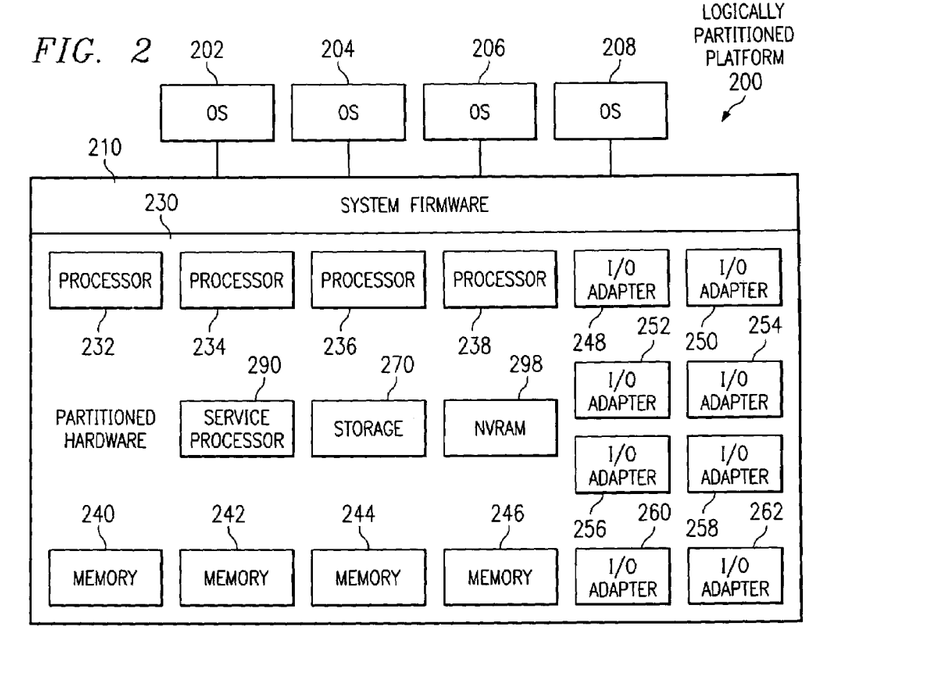
FIG. 2 is a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, system firmware (SF) 210, and operating systems 202–208. Operating systems 202–208 may be multiple copies of a single operating system or multiple heterogeneous operating systems simultaneously running on platform 200.

Partitioned hardware 230 includes a plurality of processors 232–238, a plurality of system memory units 240–246, a plurality of input/output (I/O) adapters 248–262, and a storage unit 270. Each of the processors 232–238, memory units 240–246, NVRAM storage 298, and I/O adapters 248–262 may be assigned to one of multiple partitions within logically partitioned platform 200, each of which corresponds to one of operating systems 202–208.

SF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

SF 210 is a firmware implemented virtual machine identical to the underlying hardware. Thus, SF 210 allows the simultaneous execution of independent OS images 202–208 by virtualizing all the hardware resources of logically partitioned platform 200. SF 210 may attach I/O devices through I/O adapters 248–262 to single virtual machines in an exclusive mode for use by one of OS images 202–208.

The present invention provides a method, apparatus, and computer instructions for generating a virtualized clock system for use by the different partitions, such as those illustrated in FIG. 2. In particular, the mechanism of the present invention uses RTC 197 and clock counter 198 to provide a clock system for the different OS images. The mechanism of the present invention may be implemented in code that is executed by host processors, such as host processor 101, host processor 102, host processor 103, and host processor 104. More specifically, the code may be implemented as part of system firmware, such as system firmware 210 in FIG. 2. This code allows for an OS within an LPAR data processing system to use a "set-the-time-of-the-day" function as well as a "get-the-time-of-the-day function". The service provided by these functions as seen by an OS in an LPAR environment appears functionally similar to an unshared clock in a non-LPAR environment. The mechanism of the present invention basically modifies the typical clock functions to support the use of these functions in an LPAR environment. Each LPAR partition is able to keep track of time in terms of it's locally defined time base using the mechanism of the present invention.

This locally defined time base is provided by generating an offset state for each partition which, when subtracted from the value in clock counter 198, yields an adjusted counter state for current time which is valid relative to the partition's local time-of-day (TOD) base reference state. The local time base and offset values for each partition also are saved in storage, such as NVRAM 192, and restored for partition use when executing a get-time-of-day before any set-time-of-day after rebooting. When rebooting the platform after a power off condition, the state of the clock counter 198 (which is not battery-backed in this example) is restored to a state relative to its time base, which makes it consistent with the state of the service processor real time clock, such as RTC 197.

Figure 3:
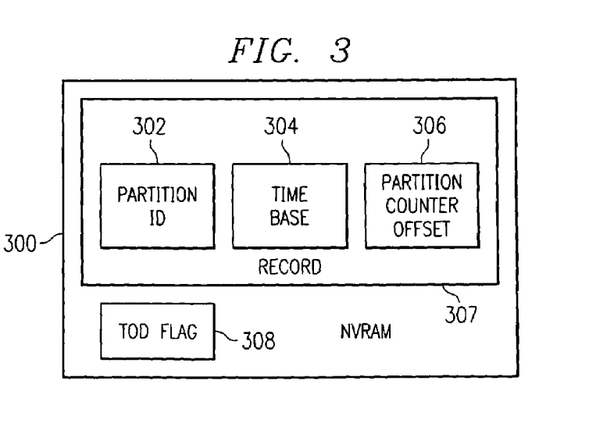
FIG. 3 is a diagram illustrating time-of-day and offset reference data stored for use in providing a virtualized clock system in accordance with a preferred embodiment of the present invention.

Turning next to FIG. 3, a diagram illustrating time-of-day and offset reference data stored for use in providing a virtualized clock system is depicted in accordance with a preferred embodiment of the present invention. In this example, data is stored in NVRAM 300, which may be implemented in data processing system 100 as NVRAM 192. In particular, partition ID 302 is stored in association with time base 304 and partition counter offset 306. The information for partition ID 302, time base 304, and partition counter offset 306 may be stored as records, such as record 307, in a table within NVRAM 300. In these examples, 16 records are used with one record per partition. Additionally, time-of-day (TOD) flag 308 is located within NVRAM 300. This flag is a global flag used to indicate whether the clock and the clock counter have been previously initialized. This flag also defines what partition is the clock controlling partition, or "first born partition". In LPAR mode, TOD flag 308 is visible to LPAR time-of-day routines and is used to indicate if RTC 197 and clock counter 198 have been previously initialized to support a virtual clock facility.

Initially, the state of TOD flag 308 in NVRAM 192 is set to indicate "no LPAR clock initialization" and each time the platform undergoes a power-on boot event, the TOD flag 308 is set to the state of the flag state, which has been saved in NVRAM 192. TOD flag 308 is also used to indicate which partition is the "first-born" clock controlling partition and also whether the non-LPAR clock has been active.

A global variable TOD_FLAG is defined in the system firmware that is set to the NVRAM TOD_FLAG entry, TOD flag 308. The reason this information is stored in NVRAM 300 is to provide for persistence of values even after the system is powered down. The possible values represent the clock controlling partition ID, so generally speaking, 1 to the maximum number of partitions, but it is also important to recognize that the system might go to SMP mode. One of the most important goals of this LPAR clock mechanism of the present invention is to maintain the system's clocks reference synchronized and consistent and to maintain valid date/time stamps (time base and offset) in NVRAM.

To check if the system has a valid symmetric multiprocessor (SMP) clock, the most significant bit is checked. In these examples, a value of 0 or 128 means that the LPAR clock has not been initialized. The value 128 is the mask for an initialized SMP system clock. Other values indicate that the LPAR clock has been initialized. If the value ranges from 1 to 16 then the number represents the clock controlling partition. With a value of 129 to 144, it is necessary to subtract 128 to compute the clock controlling partition. For example, if the TOD_FLAG is 129, 129−128=1. As a result, the clock controlling partition is partition 1.

If this flag signals no initialization when a set-time-of-day call is executed, the time-of-day clock state, which is also referred to as the "time base", is set to the date/time state of the call arguments, clock counter 198 is reset, the partition's counter state offset is set to zero, and the global flag is set to a state which indicates the ID of the "first-born" partition.

When executing a set-time-of-day call, in general, the time-of-day state defined by the parameters passed with that call are used to define a partition's new local time-of-day base reference state. Succeeding set-time-of-day calls after RTC 197 initialization, however, always generates a non-zero offset and only modifies the state of RTC 197 if executed by the "first-born" partition which executed the very first set-time-of-day call.

After initialization of the LPAR, RTC 197 clock subsystem, a partition's calendar time-of-day state is defined by the time state implied by its time base plus the state of clock counter 198 minus the partition TOD offset value. Get-time-of-day RTAS service in an LPAR partition, analyzes the state of the time base, the counter offset value, and the clock counter state or value to generate a partition's current calendar focused time-of-day state.

Figure 4:
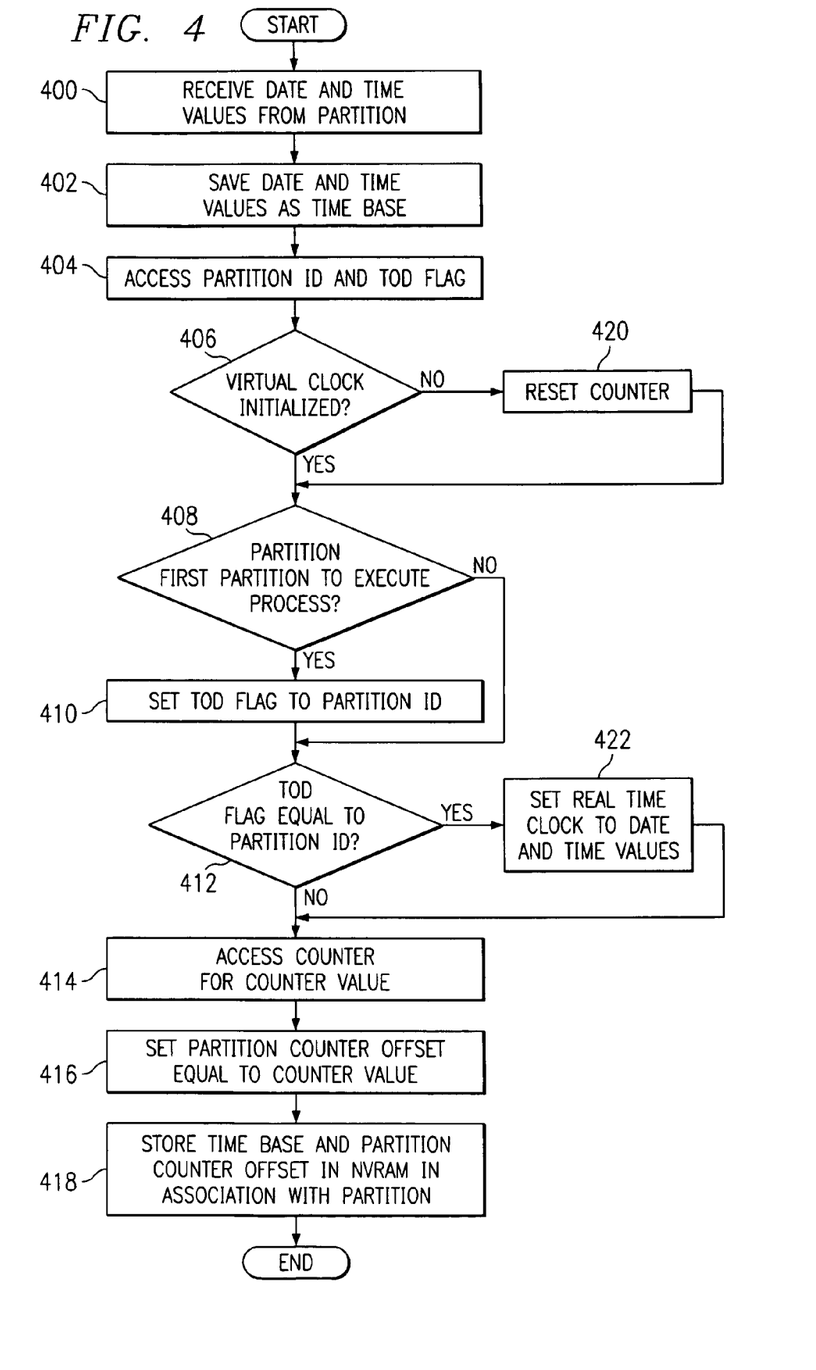
FIG. 4 is a flowchart of a process for setting the time state of a partition's virtual clock system in accordance with a preferred embodiment of the present invention.

With reference now to FIG. 4, a flowchart of a process for setting the time state of a partition's virtual clock system, is depicted in accordance with a preferred embodiment of the present invention. The process illustrated in FIG. 4 may be implemented in system firmware and executed in the host processor], such as host processor 101 in FIG. 1. In particular, this process implements a "set-time-of-day" function.

The process begins by receiving the date and time values from a partition (step 400). These values may be received as part of a request to set the date and time for a partition. Such a request may be received as a call from an operating system within the partition with the values being arguments in the call. Next, the date and time values are saved as a time base (step 402). The partition ID and TOD flag are accessed (step 404). The partition ID is obtained from storage associated with the host processor in this example. The TOD flag is found in a storage device, such as NVRAM 300.

Then, a determination is made as to whether the virtual clock has been initialized (step 406). This determination is made by examining the TOD flag with a zero value indicating that the virtual clock system has not been initialized. The virtual clock is typically uninitialized when a system is powered on. If the virtual clock has been initialized, a determination is made as to whether the partition is the first partition to execute the process (step 408). When a system is powered on, the virtual clock is uninitialized. In these examples, this situation occurs only the first time the system is powered on. This information is stored in NVRAM for persistence in subsequent power on/off cycles. The first partition to set a time actually sets the RTC. In step 408, this determination is made by examining the TOD flag, which is set to identify the partition that is first active and first sets the time. If the partition is the first partition to execute the process to set the time, the TOD flag is set to partition the ID (step 410).

This partition is the one that controls the RTC in these examples. In other words, this partition may set an RTC, such as RTC 197, in FIG. 1.

Next, a determination is made as to whether the TOD flag is equal to the partition ID (step 412). If the TOD flag is not equal to the partition ID, the counter for counter value is accessed to obtain a value or state of the counter (step 414). The partition counter offset is set equal to counter value (step 416). The time base and partition counter offset are stored in NVRAM in association with the partition (step 418) and the process terminates thereafter.

Turning back to step 412, if the TOD flag is equal to the partition ID, then the real time clock is set to the date and time values received in the request (step 422). This step allows setting of RTC 197 in FIG. 1.

Turning back to step 408, if the partition is not the first partition to execute the process, the process proceeds to step 412. With reference again to step 406, if the virtual clock has not been initialized, the clock counter is reset (step 420) with the process then proceeding to step 408 as described above.

Figure 5:
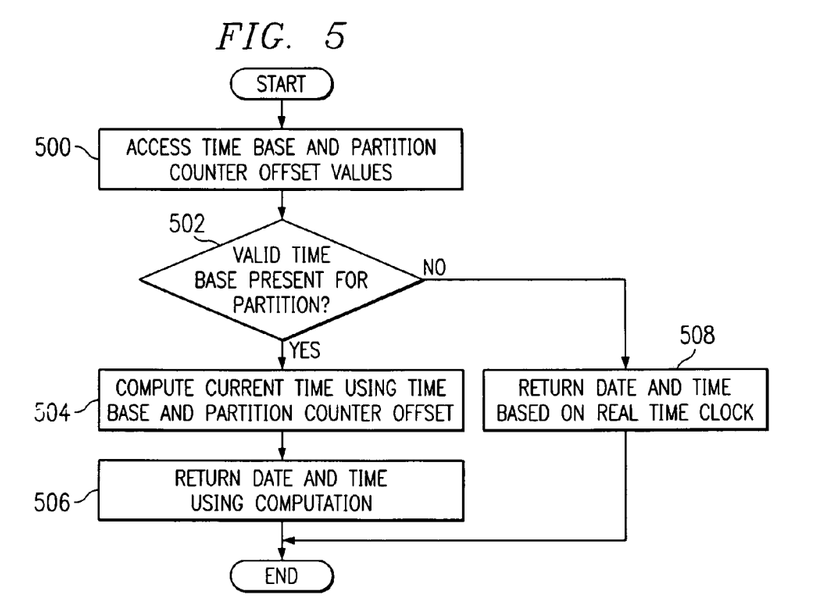
FIG. 5 is a flowchart of a process for obtaining the current time state for a partition in accordance with a preferred embodiment of the present invention.

Turning next to FIG. 5, a flowchart of a process for obtaining a current time state for a partition is depicted in accordance with a preferred embodiment of the present invention. The process illustrated in FIG. 5 may be implemented in system firmware and executes on the hosts processors, such as host processor 101 in FIG. 1. Once a call is received from an operating system to get-time-of-day or set-time-of-day, the call is processed by the host processors that execute system firmware code. Service processor entities like an RTC or a clock counter are accessed via ISA bus by the system firmware. This process is initiated as a get-the-time-of-day function, which may be called by an operating system within a partition. A call made by an operating system will return a time for that particular operating system. This process allows for different operating systems in an LPAR platform to access time information that is local to the particular partition.

The process begins by accessing the time base and partition counter offset values (step 500). This information is obtained from a storage device, such as NVRAM 300 in FIG. 3. The time base is the time and date information that was set previously by the operating system or partition. A determination is then made as to whether a valid time base is present for the partition (step 502). If a valid time base is present, the current time is computed using the time base and the counter offset is partitioned (step 504). The computation in step 504 is described in more detail in FIG. 6 below. The date and time are returned using computation performed in step 504 (step 506) with the process terminating thereafter.

Turning again to step 502, if a valid time base is not present, the date and time base are returned based on the real-time clock (step 508). The process then terminates. In some instances, no valid time base information may be present because a set-time-of-day command was not executed by the operating system. In this case, the time returned is that time specified in step 508.

Figure 6:
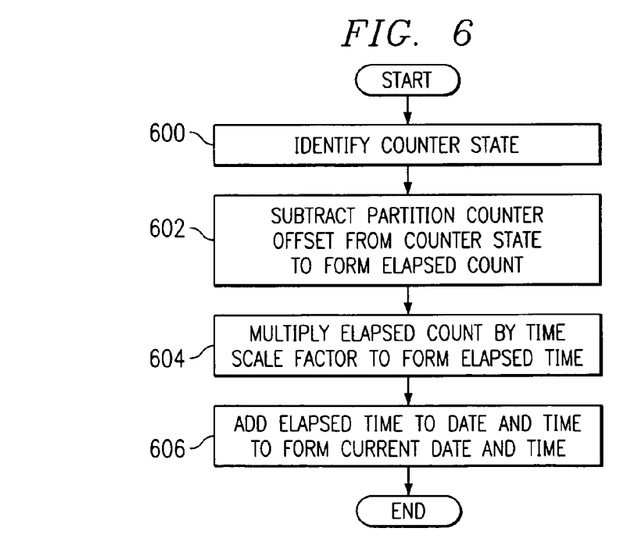
FIG. 6 is a more detailed flowchart of the process for computing partition current date and time in accordance with a preferred embodiment of the present invention.

With reference now to FIG. 6, an additional flowchart of a process for computing partition current date and time, is depicted in accordance with a preferred embodiment of the present invention. The process illustrated in FIG. 6 may be implemented in service processor, such as service processor 135 in FIG. 1. In particular, FIG. 6 is a more detailed description of step 504 in FIG. 5. In this process, the following equation is implemented:

current date/time=time base date/time+elapsed time

The elapsed time is the clock counter minus the counter offset multiplied by a time scale factor. In these examples, the time scale factor is a time unit/counter count tic. The resultant value of this expression, the current date/time, may be manipulated to yield a valid calendar date/time state, such as a Gregorian calendar/clock.

The process begins by identifying a counter state (step 600). The partition counter offset is subtracted from the counter state to form an elapsed count (step 602). The elapsed count is multiplied by the time scale factor to form an elapsed time (step 604). The elapsed time is added to the date and time to form the current date and time (step 606), with the process terminating thereafter.

In these examples, if a failure occurs in which the real time clock is disabled and a repair action is made to replace the failed clock, the TOD flag is reset. Such a resetting of the TOD flag is used to notify the partitions that the virtual clock is in an uninitialized state. Subsequent use of the set-time-of-day function and get-time-of-day function commands will reinitialize the virtual clock.

Thus, the present invention provides a method, apparatus, and computer instructions for providing a clock to partitions within an LPAR data processing system. The mechanism of the present invention provides a set-time-of-day function and get-time-of-day function in a manner that allows each partition to have a localized clock that may be set differently from other partitions. The mechanism of the present invention provides these features in these examples by saving an offset to a counter when a time is set for a particular partition. When a partition requests a time, the initial time and date set and the offset to the counter are used to generate the current time for that partition. The offset is subtracted from a counter to yield a particular elapsed time count since the time and date were set for the partition.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a set of virtual clocks in a data processing system, the method comprising:
    responsive to receiving a request to set a clock for a partition in which the request includes a time, setting an offset equal to an elapsed time counter state of a counter and determining whether a flag is equal to a partition identifier for the partition;
    responsive to the flag being equal to the partition identifier, setting a real time clock to the time; and
    storing the time and the offset in association with a partition.

2. The method of claim 1, wherein the request includes a date.

3. The method of claim 1 further comprising:
    responsive to receiving the request to set the clock for the partition, determining whether a virtual clock has been initialized in the data processing system; and
    responsive to an absence of the virtual clock resetting the counter in the data processing system prior to setting the offset.

4. The method of claim 1, wherein the partition is a logical partition within a set of logical partitions within the data processing system.

5. The method of claim 1 further comprising:
    returning an acknowledgement after storing the time and the offset.

6. The method of claim 1, wherein the time and the offset are stored in a non-volatile random access memory.

7. The method of claim 1, wherein the setting step and the storing step are performed by a host processor in the data processing system.

8. A method for obtaining a time associated with a partition in a data processing system, the method comprising:
    responsive to receiving a request for the time associated with a partition, retrieving a time base and an offset associated with the partition;
    retrieving a counter value from a counter; and
    identifying the time using The counter value, the time base, and the offset associated with the partition, the identifying step further comprising subtracting the offset from the counter value to form an elapsed count, and adding the elapsed count to the time base to form the current time.

9. The method of claim 8, wherein the current time includes a date.

10. The method of claim 8, further comprising multiplying the elapsed count by a scaling factor prior to adding the elapsed count to the time base.

11. A data processing system for managing a clock in a data processing system, the data processing system comprising:
    setting means, responsive to receiving a request to set a clock for a partition in which the request includes a time, for setting an offset equal to an elapsed time counter state of a counter;
    storing means for storing the time and the offset in association with a partition;
    determining means, responsive to receiving the request to set the clock for the partition, for determining whether a flag is equal to a partition identifier for the partition; and
    further setting means, responsive to the flag being equal to a partition identifier, for setting a real time clock to the time.

12. The data processing system of claim 11, wherein the request includes a date.

13. The data processing system of claim 11 further comprising:
    determining means, responsive to receiving the request to set the clock for the partition, for determining whether a virtual clock has been initialized in the data processing system; and
    resetting means, responsive to an absence of the virtual clock, for resetting the counter in the data processing system prior to setting the offset.

14. The data processing system of claim 11, wherein the partition is a logical partition within a set of logical partitions within the data processing system.

15. The data processing system of claim 11 further comprising:
    returning means for returning an acknowledgement after storing the time and the offset.

16. The data processing system of claim 11, wherein the time and the offset are stored in a non-volatile random access memory.

17. The data processing system of claim 11, wherein the setting step and the storing step are performed by a host processor in the data processing system.

18. A data processing system for obtaining a time associated with a partition in the data processing system, the data processing system comprising:
    first retrieving means, responsive to receiving a request for the time associated with a partition, for retrieving a time base and an offset associated with the partition;
    second retrieving means for retrieving a counter value from a counter; and
    identifying means for identifying the time using the counter value, the time base, and the offset associated with the partition, the identifying means comprising subtracting means for subtracting the offset from the counter value to form an elapsed count, and adding means for adding the elapsed count to the time base to form the current time.

19. The data processing system of claim 18, wherein the current time includes a date.

20. The data processing system of claim 18, further comprising multiplying the elapsed count by a scaling factor prior to adding the elapsed count to the time base.

21. A computer program product in a computer readable medium for use managing a clock, the computer program product comprising:
   first instructions, responsive to receiving a request to set a clock for a partition in which the request includes a time, for setting an offset equal to an elapsed time counter state of a counter;
   second instructions for storing the time and the offset in association with a partition;
   third instructions, responsive to receiving the request to set the clock for the partition, for determining whether a flag is equal to a partition identifier for the partition; and fourth instructions, responsive to the flag being equal to the partition identifier, for setting a real time clock to the time.

22. The computer program product of claim 21, wherein the request includes a date.

23. The computer program product of claim 21 further comprising:
   first instructions, responsive to receiving the request to set the clock for the partition, for determining whether a virtual clock has been initialized in the data processing system; and
   second instructions, responsive to an absence of the virtual clock, for resetting the counter in the data processing system prior to setting the offset.

24. The computer program product of claim 21, wherein the partition is a logical partition within a set of logical partitions within the data processing system.

25. The computer program product of claim 21 further comprising:
   first instructions for returning an acknowledgement after storing the time and the offset.

26. The computer program product of claim 21, wherein the time and the offset are stored in a non-volatile random access memory.

27. The computer program product of claim 21, wherein the setting step and the storing step are performed by a host processor in the data processing system.

28. A computer program product in a computer readable medium for use in obtaining a time associated with a partition, the computer program product comprising:
   first instructions, responsive to receiving a request for the time associated with a partition, for retrieving a time base and an offset associated with the partition;
   second instructions for retrieving a counter value from a counter;
   third instructions for identifying the time using the counter value, the time base, and the offset associated with the partitions;
   fourth instructions for subtracting the offset from the counter value to form an elapsed count; and
   fifth instructions for adding the elapsed count to the time base to form the current time.

29. The computer program product of claim 28, wherein the current time includes a date.

30. The computer program product of claim 28, further comprising multiplying the elapsed count by a scaling factor prior to adding the elapsed count to the time base.

* * * * *

UNITED STATES PATENT AND TRADEMARK OFFICE
CERTIFICATE OF CORRECTION

PATENT NO. : 6,968,473 B2
APPLICATION NO. : 09/998394
DATED : November 22, 2005
INVENTOR(S) : Kriz et al.

It is certified that error appears in the above-identified patent and that said Letters Patent is hereby corrected as shown below:

Col. 9, line 45: after "clock" insert -- , --.

Col. 10, line 2: after "using" delete "The" and insert --the--.

Signed and Sealed this

Twenty-first Day of November, 2006

JON W. DUDAS
*Director of the United States Patent and Trademark Office*